US008009852B2

(12) United States Patent
Gratke et al.

(10) Patent No.: US 8,009,852 B2
(45) Date of Patent: Aug. 30, 2011

(54) MICROPHONE WINDGUARD

(75) Inventors: Jesse T. Gratke, Royal Oak, MI (US); Darryl T. Fornatoro, Warren, MI (US)

(73) Assignee: General Motors LLC, Detroit, MI (US)

( * ) Notice: Subject to any disclaimer, the term of this patent is extended or adjusted under 35 U.S.C. 154(b) by 1263 days.

(21) Appl. No.: 11/609,569

(22) Filed: Dec. 12, 2006

(65) Prior Publication Data

US 2008/0137895 A1 Jun. 12, 2008

(51) Int. Cl.
*H04R 9/08* (2006.01)
*H04B 1/00* (2006.01)

(52) U.S. Cl. ........... 381/359; 381/355; 381/365; 381/86

(58) Field of Classification Search .................... 381/86, 381/355, 359, 361, 365
See application file for complete search history.

(56) References Cited

U.S. PATENT DOCUMENTS

| | | | | |
|---|---|---|---|---|
| 6,108,415 | A * | 8/2000 | Andrea | 379/433.03 |
| 7,369,664 | B2 * | 5/2008 | Kargus et al. | 381/86 |
| 2006/0013425 | A1 | 1/2006 | Kargus, IV et al. | |
| 2007/0092097 | A1 * | 4/2007 | Williams et al. | 381/355 |

FOREIGN PATENT DOCUMENTS

DE 3901158 A1 7/1990

* cited by examiner

*Primary Examiner* — Curtis Kuntz
*Assistant Examiner* — Sunita Joshi
(74) *Attorney, Agent, or Firm* — Anthony L. Simon; Reising Ethington P.C.

(57) ABSTRACT

A windguard for a microphone includes an acoustic inlet at a downstream end and at least one pressure-relief port upstream of the acoustic inlet. The windguard has a base, a skirt depending from the base, and a first hood projecting from the base. The base and skirt provide space to accommodate the microphone. The first hood extends from an upstream end of the base to the downstream end and includes the acoustic inlet at the downstream end. The pressure-relief port(s) is located on the first hood at the upstream end and is protected by a second hood.

14 Claims, 3 Drawing Sheets

MICROPHONE WINDGUARD

TECHNICAL FIELD

This invention relates to microphones and, more particularly, to windguards for hands-free microphones such as those used in automatic speech recognition (ASR) systems.

BACKGROUND OF THE INVENTION

ASR technology enables microphone-equipped computing devices to interpret speech and thereby provide an alternative to conventional human-to-computer input devices such as keyboards or keypads. For example, vehicle telecommunications devices can be equipped with voice dialing features enabled by an ASR system. The ASR system typically includes a hands-free microphone to receive speech from an occupant of a vehicle. The hands-free microphone is usually located in a forward portion of a passenger compartment of the vehicle, such as in an instrument panel, an A-pillar molding, a rear view mirror assembly, a headliner, overhead console, or the like. Such a forward-positioned microphone is generally satisfactory to enable reliable recognition of speech from a driver.

A forward-mounted microphone may be susceptible to airflow noise due to local pressure variations in an air stream such as from windshield defroster vents, open windows, or open roofs. Accordingly, some ASR systems deploy complex digital signal processing and noise cancellation techniques, or multiple microphone arrays, to reduce the influence of airflow noise. But these approaches add cost and complexity to the ASR system. Therefore, windguards are often provided to ameliorate the effects of rapidly moving air over a microphone.

Many windguards are susceptible to Helmholtz resonance, which is a phenomenon of air resonance in a cavity. When air is forced past an acoustic inlet of a windguard, the air pressure inside tends to cyclically increase and decrease, thereby causing vibration and noise that a microphone can pick up, similar to the sound created when one blows across the top of an empty bottle. Thus, such resonant sound can produce poor signal-to-noise ratios from a microphone, thereby rendering conventional windguards counterproductive.

SUMMARY OF THE INVENTION

A windguard for a microphone includes an acoustic inlet at a downstream end and at least one pressure-relief port upstream of the acoustic inlet.

In one embodiment of the invention, the windguard comprises a base, a skirt depending from the base, and a first hood projecting from the base which includes at least one pressure-relief port, a second hood upstream of the port(s) and an acoustic inlet downstream of the pressure-relief port(s). The acoustic inlet is recessed within the first hood at a downstream end of the windguard, and the pressure-relief port(s) is at least partially recessed within the second hood at an upstream end of the windguard.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
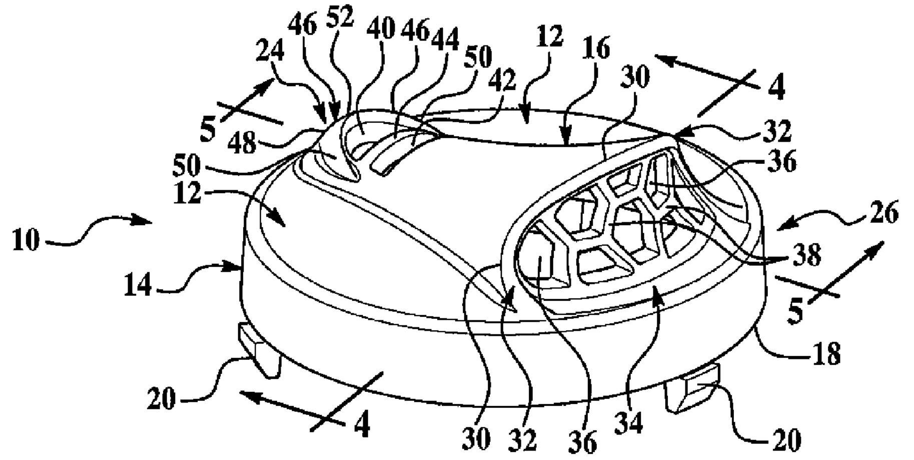
FIG. 1 shows a perspective view of an exemplary windguard.

With reference to the drawings, FIGS. 1 through 6 illustrate a windguard 10 for protecting a microphone M from airflow to improve a signal-to-noise ratio of the microphone M. The windguard 10 can include a base 12, and a skirt 14 depending from the base 12 to divert airflow around the microphone M. The windguard 10 also includes a hood 16 projecting from the base 12 in a direction substantially opposite that of the skirt 14, to divert airflow over and away from the microphone M. The base 12, the skirt 14, and the hood 16 at least partially define an interior I of the windguard 10 in which the microphone M may be disposed.

Figure 4:
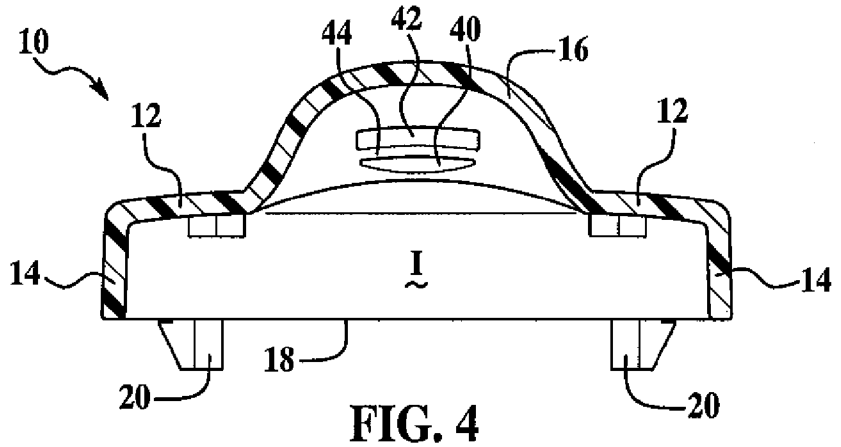
FIG. 4 shows a transverse cross-sectional view of the windguard of FIG. 1, taken along line 4-4 thereof.
Figure 5:
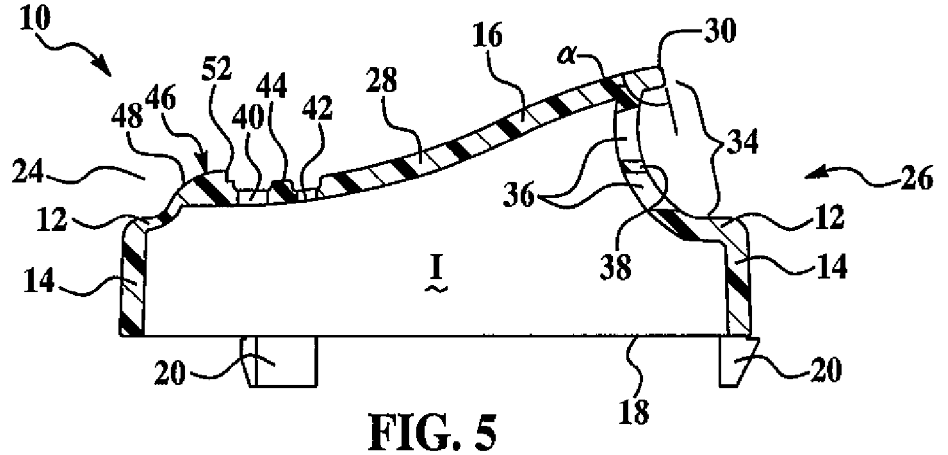
FIG. 5 shows a longitudinal cross-sectional view of the windguard of FIG. 1, taken along line 5-5 thereof.
Figure 6:
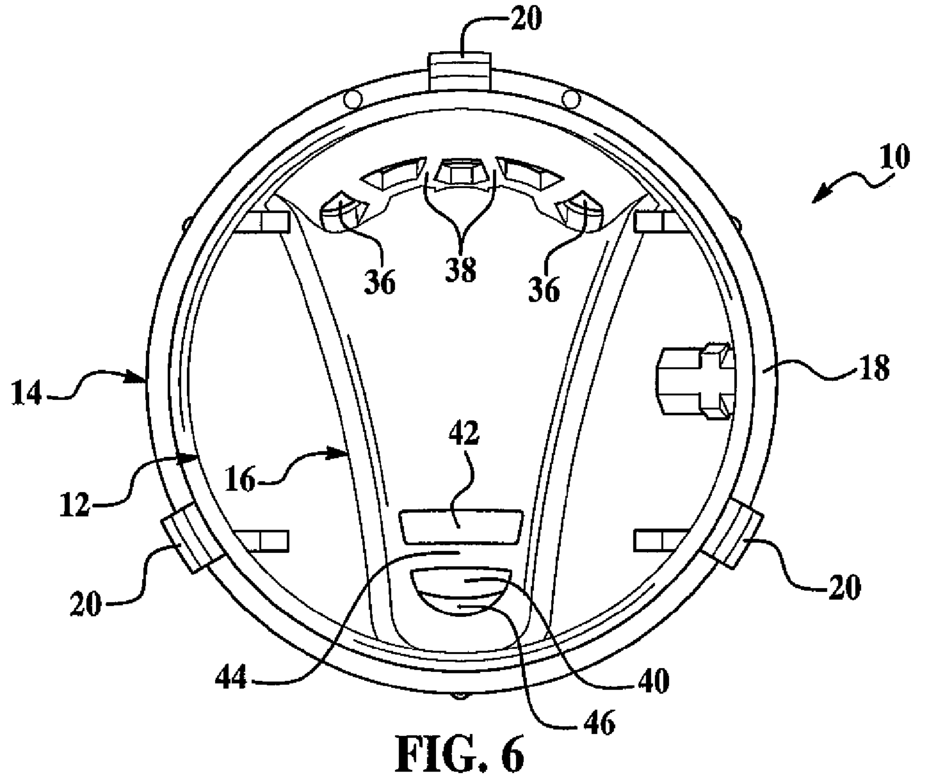
FIG. 6 shows a bottom view of the windguard of FIG. 1.

The base 12 interconnects the skirt 14 and the hood 16. The base 12 can be generally planar as shown, but can be of any suitable shape and configuration. The base 12 connects to the skirt 14 at the sides of the windguard 10 as shown in FIG. 4 and at the upstream and downstream ends of the windguard 10 as shown in FIG. 5. The wall thickness of the base 12 can be substantially constant or variable.

The skirt 14 generally provides several functions. First, it spaces the base 12 away from another component C (FIG. 2) to which the windguard 10 may be mounted in order to accommodate the microphone M. Second, the skirt 14 provides a wall to protect the microphone M from airflow by diverting the airflow around the skirt 14. The skirt 14 is preferably substantially circumferentially continuous, can be substantially cylindrical in shape, and can be of substantially constant or varying wall thickness. Third, the skirt 14 can include a mounting surface 18 having several retainers 20 extending therefrom for attaching the windguard 10 to the other component C. The retainers 20 can be any suitable type of retainers including snap-in bayonet style retainers as shown. The windguard 10 can be mounted against and attached to any suitable component, such as a wall, panel, housing, bezel, or the like, wherein the retainers 20 snap into corresponding openings O in the component C. The skirt 14 can also include one or more reliefs 22 such as in the mounting surface 18 as shown. The reliefs 22 can provide flexibility for the skirt 14 and ventilation for the interior I of the windguard 10. The reliefs 22 are preferably located on the sides and downstream portions of the skirt 14.

The microphone M can be any suitable device, such as an electroacoustic device including a transducer to convert sound pressure waves to electrical signals. Common microphones include pressure microphones and pressure-gradient microphones. Also, the microphone M can be part of a larger microphone assembly A, which may include a microphone housing, foam, and the like, in addition to the microphone M. Finally, the microphone M can be positioned within the interior I of the windguard 10 and on an outside surface of the component C as shown, or partially or completely behind the outside surface of the component C such as through an aperture thereof, or anywhere therebetween.

The hood 16 generally provides an inclined structure to protect the microphone M from airflow by directing the airflow over and away therefrom. By diverting airflow over and away from the microphone M, the hood 16 can improve the signal-to-noise ratio capability of the microphone M. The hood 16 can be any suitable shape such as half-cone shape, wedge shape, tapered rectangular shape, arched shape, horn-shaped as shown, or the like. The hood 16 includes an upstream end 24 substantially defining a rear or upstream end of the windguard 10, a downstream end 26 that is elevated with respect to the upstream end 24 and that substantially defines a rear or downstream end of the windguard 10, and a midsection 28 between the upstream and downstream ends 24, 26. The hood 16 extends longitudinally from its relatively narrow and short upstream end 24 to its relatively wide and tall downstream end 26 wherein the hood 16 preferably generally outwardly tapers or flares somewhat like a horn.

At its downstream end 26, the hood 16 includes an airflow separation edge 30. The airflow separation edge 30 can be a curved transition edge between the outer surface of the hood 16 and a downstream lip 32 of the hood 16. More specifically, the airflow separation edge 30 can be semi-circular in shape and can be the apex of an angle $\alpha$ formed by the intersection of the lip 32 and the excurvate outer surface of the hood 16 adjacent the lip 32. The lip 32 extends transversely with respect to the longitudinal axis of the hood 16 and curves toward the base 12 to which the lip 32 is attached on either side of an acoustic inlet 34 defined between the lip 32 and the base 12. Thus, the acoustic inlet 34 is disposed substantially at the downstream end of the windguard 10 and is recessed into hood 16 in a substantially horizontal orientation. The acoustic inlet 34 includes a plurality of openings 36 defined by a grille 38. The openings 36 can be of any suitable quantity and shape. If desired, any suitable type of foam (not shown) can be provided in or behind the grille 38 to protect the microphone M from dust, liquid spills, and the like.

The windguard 10 includes one or more features to relieve pressure fluctuations within the interior I of the windguard 10. More specifically, one or more apertures 40, 42 are substantially disposed at the upstream end 24 of the hood 16 to eliminate or at least reduce Helmholtz resonance. These apertures comprise pressure-relief ports. In contrast to the generally horizontally oriented acoustic inlet 34, the apertures 40, 42 are preferably substantially vertically oriented through the hood 16. Any suitable number of apertures can be provided, such as the two apertures 40, 42, which can be of any suitable shape and size, and can be separated by a bridge portion 44. Instead, a single aperture could be provided if desired. In any case, the apertures 40, 42 are preferably protected from airflow in any suitable manner.

Accordingly, adjacent and upstream of the apertures 40, 42, a fin or a second, smaller, hood 46 is provided to protect the pressure relief apertures 40, 42 from airflow. The second hood 46 can be of any suitable shape, and can include an exemplary excurvate outer surface 48 that defines an excurvate outer surface of the hood 16 upstream of the midsection 28, and can include laterally opposed sides 50 that connect to the excurvate outer surface 48. The second hood 46 includes a small, curved, flow separation edge 52 defined at the apex of its excurvate outer surface 48 and its laterally opposed sides 48. As shown, the pressure-relief port(s) as a group can be at least partially recessed within the second hood 46.

Figure 2:
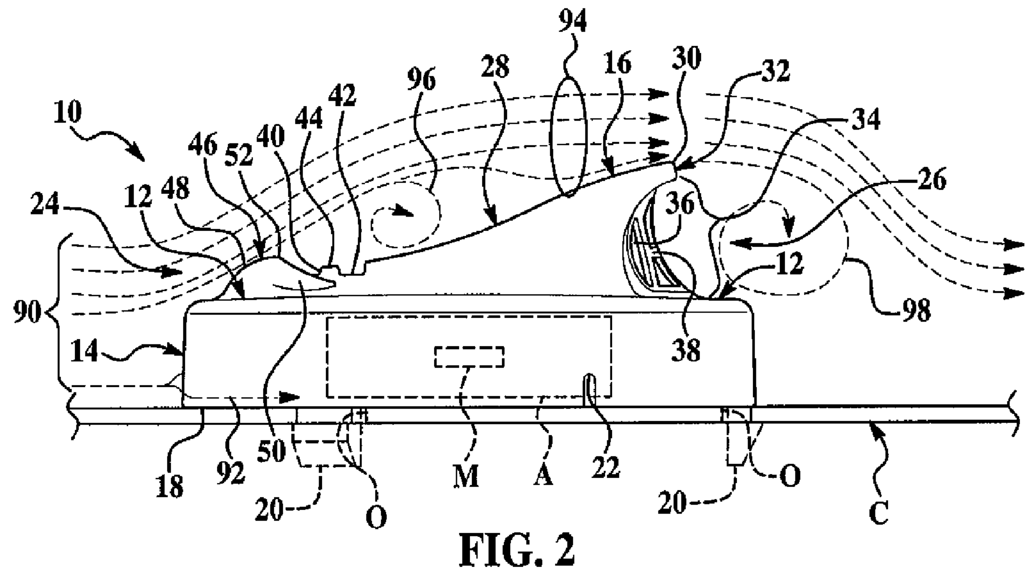
FIG. 2 shows a side view of the windguard of FIG. 1.
Figure 3:
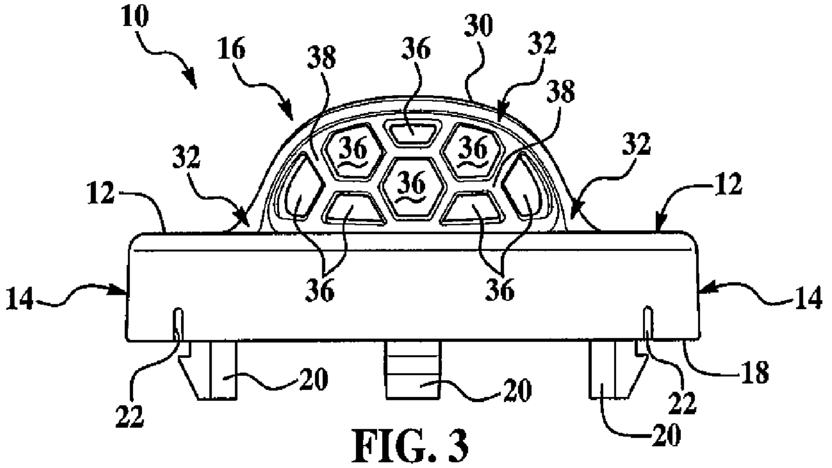
FIG. 3 shows a front view of the windguard of FIG. 1.

The first hood 16 is preferably contoured and can be of any suitable shape. For example, the hood 16 can be both incurvately shaped and excurvately shaped in longitudinal cross-section as best shown in FIGS. 2 and 5. The hood 16 transitions from an excurvate shape defined by the second hood 46 at the upstream end 24 to an incurvate shape at its midsection 28, and transitions back from the incurvately shaped midsection 28 to an excurvate shape at the downstream end 26. In another example, the hood 16 can be excurvately shaped in transverse cross-section as best shown in FIGS. 3 and 4.

The windguard 10 can be composed of any suitable material and can be manufactured in any suitable manner. For example, the windguard 10 can be injection molded from any suitable polymeric material, such as those commonly found in automobile interiors. Some parts of the windguard can be formed as a unitary component, such as base 12, skirt 14, and hood 16; whereas other parts can be separately formed and then integrally attached; for example, the grille 38 which can be glued or welded within acoustic inlet 34. Alternatively, the entire windguard could be formed as a unitary component. The windguard 10 can be of any suitable size. For example, the windguard 10 can be on the order of about one to two inches in diameter.

Referring now to FIG. 2, when an airflow 90 flows past the windguard 10, the airflow 90 is diverted around the skirt 14 as shown by a diverted airflow 92, and deflected over the hood 16 as shown by a deflected airflow 94. First, a portion of the deflected airflow 94 separates from the hood 16 at the flow separation edge 52 of the second hood 46. That portion of the deflected airflow 94 becomes an upstream recirculating airflow 96. The recirculating airflow 96 preferably recirculates according to a circular flow downstream of the apertures 40, 42 in an upstream recirculation zone, which may be at least partially defined by the incurvately shaped midsection 28 of the hood 16. Downstream of the upstream recirculation zone, the deflected airflow 94 reattaches to the external surface of the hood 16 in an upstream reattachment zone, which may be at least partially defined by the excurvately shaped portion of the hood 16. Second, a portion of the deflected airflow 94 separates from the hood 16 at the flow separation edge 30 of the hood 16. That portion of the deflected airflow 94 becomes a downstream recirculating airflow 98 that, preferably, recirculates according to a circular flow downstream of the acoustic inlet 34 in a downstream recirculation zone.

Figure 7:
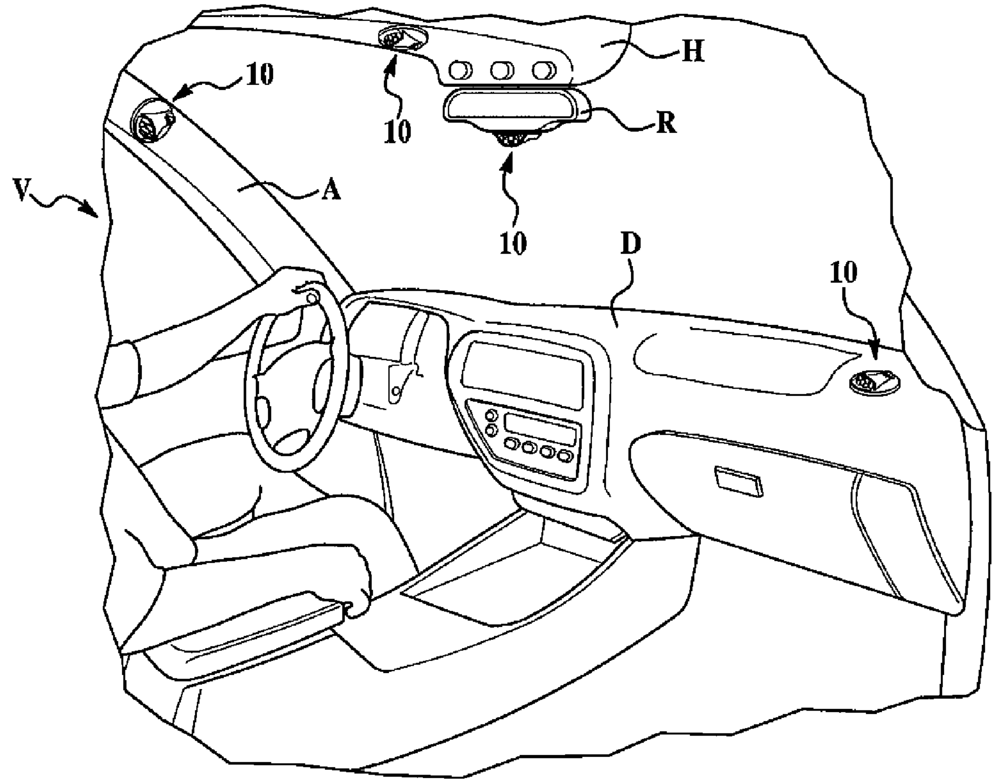
FIG. 7 shows the windguard of FIG. 1 incorporated in several different components in a forward portion of a passenger compartment of a vehicle.

Referring now to FIG. 7, the windguard 10 can be used in any suitable application in any suitable location. For example, the windguard 10 can be used in a passenger compartment of a vehicle interior V such as on any of a number of components of the vehicle interior V. More particularly, the windguard 10 can be mounted on an A-pillar interior molding A, a housing of an overhead console H, a rear-view mirror assembly R, and a dashboard or instrument panel D. Although not shown, the windguard 10 could also be mounted to a steering wheel, center console, headliner (not shown), B-pillar molding, door panel, mouthpiece of a hands-free headset, or the like. Moreover, any of these interior components can include the windguard 10 or just the hood 16 thereof. For example, a molding can be molded to integrate the hood 16 therewith, with or without the body 12 and/or skirt 14.

Figure 8:
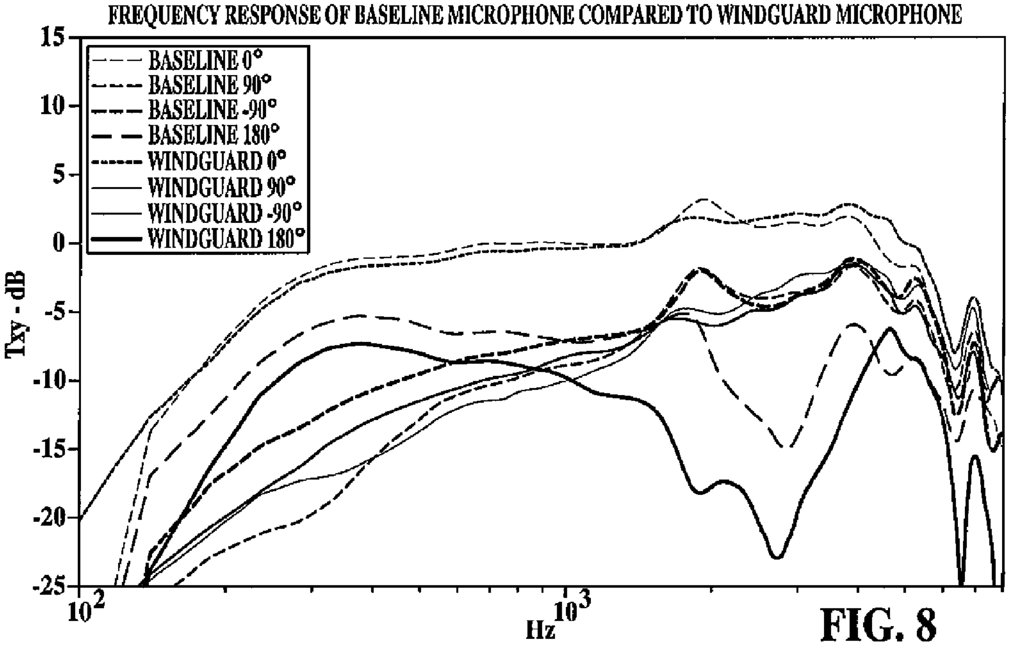
FIG. 8 shows a plot of frequency response of a microphone with and without the windguard of FIG. 1.

Referring now to FIG. 8, a frequency response graph shows two sets of plots: frequency response plots of a microphone with the windguard 10, and baseline plots without the windguard 10. Both sets of plots including readings from in front of the microphone (0°), from the sides (90°, −90°), and from the rear (180°). As shown, the windguard 10 enables a microphone to perform with a substantially flatter frequency response from about 300 Hz to about 5 kHz and with improved microphone directivity. The graph reveals that the windguard 10 provides a relatively inexpensive solution to airflow and noise problems with in-vehicle hands-free microphones. Accordingly, the windguard 10 can improve microphone signal-to-noise ratio performance and, thus, voice and speech recognition performance.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A microphone windguard having an acoustic inlet at a downstream end and at least one pressure-relief port upstream of the acoustic inlet, further comprising a hood including the pressure-relief port(s) therein at an upstream end, and an airflow separation edge at a downstream end, wherein the hood is contoured in longitudinal cross-sectional profile and in transverse cross-sectional profile and includes an incurvate contoured portion between the pressure-relief ports(s) and the airflow separation edge.

2. The windguard set forth in claim 1, wherein the hood further includes an excurvate contoured portion upstream of the one pressure-relief port(s).

3. The windguard set forth in claim 1, wherein the hood includes a second hood upstream of the pressure-relief port (s).

4. The windguard set forth in claim 3, wherein the second hood is adjacent the pressure-relief port(s).

5. The windguard set forth in claim 1, wherein the airflow separation edge is curved.

6. The windguard set forth in claim 5, wherein the airflow separation edge is semi-circular in shape.

7. A vehicle interior instrument panel including the windguard set forth in claim 1.

8. A vehicle interior A-pillar molding including the windguard set forth in claim 1.

9. A vehicle interior rear view mirror assembly including the windguard set forth in claim 1.

10. A vehicle interior overhead console including the windguard set forth in claim 1.

11. A windguard for a microphone, comprising:

a base;

a skirt depending from the base;

a first hood projecting from the base and including:

at least one pressure-relief port;

a second hood upstream of the port(s); and an acoustic inlet downstream of the pressure-relief port (s).

12. The windguard of claim 11, wherein the first hood is contoured in longitudinal and transverse cross-sectional profiles.

13. The windguard of claim 12, wherein the first hood is excurvately contoured in transverse cross-sectional profile, and both incurvately and excurvately contoured in longitudinal cross-sectional profile.

14. The windguard of claim 11, wherein the acoustic inlet is recessed within the first hood at a downstream end of the windguard, and the pressure-relief port(s) is at least partially recessed within the second hood at an upstream end of the windguard.

* * * * *